United States Patent [19]

Bond, Jr. et al.

[11] 4,022,961
[45] May 10, 1977

[54] FULVENE-SILANE ADDUCT AND ETHYLENE INTERPOLYMERS EMBODYING SAME

[75] Inventors: William C. Bond, Jr.; Harold J. Wahlborg, both of Baton Rouge, La.

[73] Assignee: Copolymer Rubber & Chemical Corporation, Baton Rouge, La.

[22] Filed: Sept. 8, 1975

[21] Appl. No.: 610,988

Related U.S. Application Data

[63] Continuation-in-part of Ser. No. 546,933, Feb. 4, 1975, which is a continuation of Ser. No. 320,482, Jan. 2, 1973, abandoned, which is a continuation of Ser. No. 112,068, Feb. 2, 1971, abandoned.

[52] U.S. Cl. .......................... 526/279; 260/42.26; 260/42.31; 260/42.33; 260/448.2 N; 260/448.2 H; 260/448.2 Q; 526/61; 526/79; 526/141; 526/143; 526/916

[51] Int. Cl.$^2$ ................ C08F 15/40; C08F 30/08; C08F 130/08; C07F 7/02

[58] Field of Search ............ 260/448.2 N, 448.2 H, 260/448.2 Q; 526/279

[56] References Cited

UNITED STATES PATENTS

| 2,847,409 | 8/1958 | De Benneville et al. ......... 260/89.7 |
| 3,240,768 | 3/1966 | Guenther .......................... 260/88.1 |
| 3,375,236 | 3/1968 | van de Castle et al. ........ 260/80.71 |
| 3,577,399 | 5/1971 | Mortimer .......................... 260/88.1 |
| 3,644,306 | 2/1972 | Longi et al. ..................... 260/80.71 |

*Primary Examiner*—Joseph L. Schofer
*Assistant Examiner*—Herbert J. Lilling
*Attorney, Agent, or Firm*—McDougall, Hersh & Scott

[57] ABSTRACT

An adduct of a fulvene and unsaturated silane produced in a Diels-Alder reaction and the interpolymerization of the adduct with ethylene, with or without propylene, with or without a polyene, in the preparation of ethylene interpolymers.

16 Claims, No Drawings

FULVENE-SILANE ADDUCT AND ETHYLENE INTERPOLYMERS EMBODYING SAME

This is a continuation-in-part of our copending application Ser. No. 546,933, filed Feb. 4, 1975 as a continuation of application Ser. No. 320,482, filed Jan. 2, 1973, now abandoned, which was a continuation of the then copending application Ser. No. 112,068, filed Feb. 2, 1971, and now abandoned.

This invention relates to the reaction products of fulvenes with unsaturated organo silicon compounds to produce a Diels-Alder adduct which can be utilized as a monomer in the manufacture of ethylene interpolymers, with ethylene as the first monomer and with or without a monoolefin having from 3–20 carbon atoms as the third monomer, or which can be used as the fourth monomer in the manufacture of EPDM tetrapolymers of ethylene, a monoolefin as previously described and a polyene to impart curability or vulcanizability with sulfur to the interpolymer that is formed, and it relates more particularly to the manufacture of such Diels-Alder adducts.

It is an object of this invention to produce and to provide a method of producing a compound having the general formula:

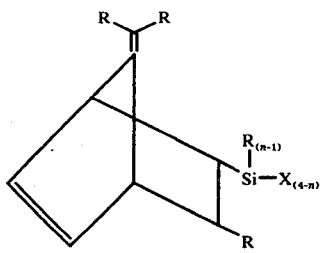

in which R may be hydrogen, a lower alkyl group, such as methyl, ethyl, propyl, isopropyl, butyl, pentyl and the like, a halogen substituted lower alkyl group and in which R may also be an unsaturated organic group such as vinyl, allyl, norbornenyl and the like, X is a highly hydrolyzable group such as a tertiary amino group, a halogen group such as chlorine, bromine, iodine and the like, and $n$ is a number of from 1 to 3, and it is a related object of this invention to produce and to provide a method for producing the compound 7-isopropylidenyl-5-trichlorosilyl-2-norbornene.

It is another object of this invention to make use of a compound of the type described as a monomer in the preparation of interpolymers of ethylene, with or without one or more monoolefins containing from 3–20 carbon atoms with or without a polyene.

Referring first to the compounds of this invention, they may be prepared in accordance with the following equation:

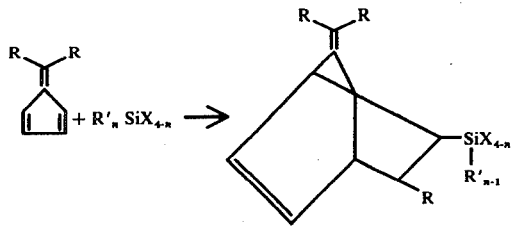

in which R and R' may be hydrogen, a lower alkyl group, such as methyl, ethyl, propyl, isopropyl, butyl, pentyl and the like, a halogen substituted lower alkyl group and in which R and R' may be an unsaturated organic group such as vinyl, allyl, norbornenyl and the like, but in which at least one R' group is an unsaturated group, X is a highly hydrolyzable group such as a tertiary amino group, a halogen group such as chlorine, bromine, iodine and the like, and $n$ is a number of from 1 to 3.

In the preferred practice of this invention, R is methyl, R' is vinyl, X is chlorine and $n$ is 1, dimethyl fulvene is reacted with vinyltrichlorosilane to produce 7-isopropylidenyl-5-trichlorosilyl-2-norbornene, as represented by the following equation:

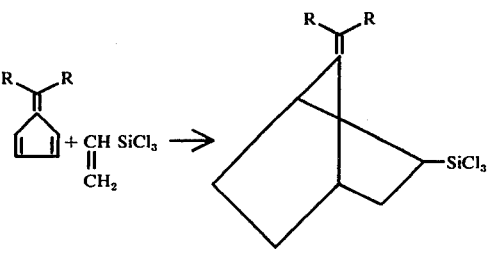

The reaction is carried out preferably in solution in an inert organic solvent such as benzene, toluene and the like, with the reactants present in the stoichiometric amounts plus or minus 50% by weight, with the more available and more easily separable component present in excess to drive the reaction to the right.

The following examples are given by way of illustration, but not by way of limitation, of the preparation of compounds of this invention:

EXAMPLE 1

Into a dry, nitrogen flushed, three-necked, 100 ml flask equipped with a thermometer, condenser, addition funnel and magnetic stirrer, addition was made by 40 g of vinyltrichlorosilane and 23.5 g of dimethylfulvene. The mixture was heated to reflux and the temperature then slowly rose to 90° C and was maintained for one-half hour. The HCl was removed by means of a water aspirator and then the reaction mixture was distilled. A single cut of pale yellow liquid (7.3 g) was recovered at 75° C and 0.4 mm of mercury and identified by Nuclear Magnetic Resosance to be 7-isopropylidenyl-5-trichlorosilyl-2-norbornene. The NMR spectrum displayed definitive bands at 6 = 1.52 (sharp singlet; allylic methyls), δ = 3.44 (broad; diallylic bridgehead protons), and δ = 6.20 (broad singlet; olefinic norbornene ring protons). A chemical chlorine 37.90%, and silicon 10.19%. The calculated values are as follows: C, 45.15%; H, 4.89%; Cl, 39.66%; Si, 10.56%.

Into the flask similar to that used in Example 1, addition was made of 48 g vinyltrichlorosilane, 21.5 g of dimethylfulvene, and 15 ml of anhydrous benzene. On the addition of the dimethylfulvene there was a slight exotherm. The reaction was carried out with stirring at room temperature for one-half hour and then heated to reflux. Reflux started at 78° C and then slowly climbed to 100° C. After three hours at reflux, the reaction was cooled to room temperature. The product was distilled by stripping off benzene and unreacted starting material and recovering the product by distillation within the range of 70°–71° C and 0.4 mm mercury. A yield of 20 g (37.7% of theoretical) of 7-isopropylidenyl-5-trichlorosilyl-2-norbornene was obtained.

The reaction proceeds with the formation of a relatively large amount of undesirable polymeric residue. It has been found that the formation of polymeric residue can be greatly reduced and the yield markedly increased by the presence in the reaction mixture of a small amount of a hydrogen halide scavenger, for example a tertiary amine such as pyridine and the like and preferably collidene or other substituted pyridines. The tertiary amine, or other hydrogen halide scavenger which can be added with the dimethylfulvene, not only operates to improve the yield of the product and reduce polymer formation, but it also conserves the starting material to enable re-use or recycle greatly to increase the efficiency of the reaction. It is sufficient if the hydrogen halide scavenger is present in the reaction mixture in an amount within the range of 0.1% to 10% and preferably 2% to 5% by weight of the reactants.

The following will illustrate the further improvement in the process and product of this invention:

EXAMPLE 2

A 250 ml pressure bottle was charged with 25 ml benzene, 47.5 g dimethylfulvene, 4.5 collidene and 108 g vinyltrichlorosilane. The bottle was purged with nitrogen, sealed and heated to 125° C for three hours. The reaction mixture was cooled, filtered and distilled. Starting material was recovered and 63.6 g of product boiling at 97°–100° C at 2 mm mercury was obtained with only 7 g of residue. The yield of 7-isopropylidenyl-5-trichlorosilyl-2-norbornene was 53%.

Instead of collidene, pyridine, other tertiary amines or hydrogen halide scavengers can be used in Example 2.

EXAMPLE 3

A 250 ml pressure bottle was charged and treated as in Example 3 except that an additional 25 ml of benzene and no hydrogen halide scavenger were present. There appeared to be some polymerization when all the reactants were combined. Some starting material was recovered, 25.3 g of product was distilled and 36 g of high boiling residue was left in the pot. The yield of 7-isopropylidenyl-5-trichlorosilyl-2-norbornene amounted to 20.8% of theoretical.

The compounds of this invention are characterized by a number of reactive sites: For example an internal double bond which is highly polymerization active by reason of the strained ring and "ylidenyl" type linkages; the isopropylidenyl group that remains after polymerization has six allylic hydrogens on the methyl groups attached to the strained double bond which renders the compound reactive for cure or vulcanization; and the highly hydrolyzable groups, such as the halogen groups, which remain attached to the silicon atom which, when incorporated into a polymer, give active sites for further reaction such as branching, crosslinking, substitution, grafting and the like. By reason of these novel functions, the compounds of this invention can be used to advantage as a monomer in the preparation of curable or sulfur vulcanizable interpolymers by interpolymerization with ethylene with or without at least one monoolefin having from 3–20 carbon atoms, preferably propylene, or as a fourth monomer in the preparation of curable or sulfur vulcanizable interpolymer by reaction with ethylene, at least one monoolefin having from 3–20 carbon atoms, preferably propylene, and a polyene, in the normal manner for the preparation of EPDM rubbers.

The novel interpolymers of the invention are prepared by interpolymerizing a monomeric mixture containing ethylene, the monomer produced in accordance with the practice of this invention, and with or without one or more alpha-monoolefins containing 3–20 carbon atoms and preferably 3–10 carbon atoms, and with or without a polyene, in solution in an inert organic solvent and in the presence of a Ziegler type catalyst to be described more fully hereinafter.

In the practice of this invention, it is preferred that the interpolymer of ethylene with the monomer of this invention are chemically bound between the weight ratios of ethylene to monomer of 99.95 to 0.05 and 80.0 to 20.0 and preferably between 99.9 to 0.10 and 90.0 to 10.0.

In the practice of this invention it is preferred that the interpolymers be prepared from a monomeric mixture in which the ethylene and straight chain higher monoolefin, such as propylene, are chemically bound in the molecular ratios of ethylene to propylene varying between 90:5 and 10:95 and preferably between 70:30 and 55:45.

The monomer of this invention and the polyene, when employed in a tetrapolymer, are chemically bound in the elastomer in an amount to provide an effective unsaturation level of at least 1.5 and preferably at least 2 carbon-to-carbon double bonds per 1000 carbon atoms in the polymer. Much higher effective unsaturation levels are possible such as up to 50 or more carbon-to-carbon double bonds per 1000 carbon atoms. The specific effective unsaturation level which is selected in a given instance will vary depending upon the properties desired in the elastomer.

The polymerization solvent may be any suitable organic solvent which is liquid and inert under the reaction conditions, and it may be a prior art solvent for solution polymerization of monoolefins in the presence of Ziegler catalysts. Examples of satisfactory hydrocarbon solvents include acyclic paraffins and olefins containing 3–8 carbon atoms, or which hexane often is preferred; aromatic hydrocarbons and especially those containing a single benzene nucleus such as benzene, toluene, etc.; and saturated cyclic hydrocarbons which have boiling ranges approximating those for the straight chain paraffin hydrocarbons and aromatic hydrocarbons discussed above, and especially saturated cyclic hydrocarbons containing 5 or 6 carbon atoms in the ring, or chlorinated hydrocarbons such as carbontetrachloride, chlorobenzene and tetrachloroethylene. The solvent selected may be a mixture of one or more of the foregoing, such as a mixture of aliphatic and naphthenic hydrocarbon isomers having approximately the same boiling range as normal benzene. It is necessary that the solvent be dry and free of substances which will interfere with the catalyst to be used in the polymerization step.

Ziegler catalysts in accordance with the prior art may be used. In general, any suitable prior art Ziegler-type catalyst may be used which is known to produce a satisfactory elastomer. Ziegler catalysts are disclosed in a large number of issued patents, such as U.S. Pat. Nos. 2,933,480, 3,093,620, 3,093,621, 3,211,709 and 3,113,115. Examples of Ziegler catalysts include metal organic coordination catalysts prepared by contacting a compound of a heavy catalyst metal of Groups IVb, Vb, VIb and VIIb of the Mendelejeff periodic chart of the elements, as typified by titanium, vanadium and chromium halides with an organometallic compound of a metal of Groups I, II and III of the Mendelejeff periodic chart which contains at least one carbon-metal bond, as typified by trialkyl aluminum and alkyl aluminum halides wherein the alkyl groups contain 1–20 and preferably 1–4 carbon atoms. The term Ziegler catalyst as used herein is intended to embrace catalysts of the foregoing types, some of which are often referred to as Ziegler-Natta or low pressure polymerization catalysts for alpha-monoolefins.

The preferred Ziegler catalyst for many polymerizations is prepared from a vanadium compound and an alkyl aluminum halide. Examples of suitable vanadium compounds include vanadium trichloride, vanadium tetrachloride, vanadium oxychloride, vanadium acetylacetonate, etc. Activators which are especially preferred include alkyl aluminum chlorides of the general formulae $R_1AlCl_2$ and $R_2AlCl$, and the corresponding sesquichlorides of the general formula $R_3Al_2Cl_3$, wherein R is a methyl, ethyl, propyl, butyl or isobutyl radical. In the catalytic system, the aluminum to vanadium mole ratio of the aluminum vanadium compounds may be within the range of 5:1 to 200:1 and preferably within the range of 10:1 to 60:1. These same ratios apply with respect to the corresponding compounds of heavy metals of the Groups IVb, Vb, VIb and VIIb for the vanadium compound and the organometallic compounds of Groups I, II or III for the aluminum compound. A catalyst prepared from alkyl aluminum sesquichloride, such as the methyl or ethyl aluminum sesquichloride and vanadium oxychloride is especially preferred and, when using this catalyst, the preferred ratio of catalyst components is usually 1 mole vanadium oxychloride for each 5–200 moles of aluminum and, more preferably, for each 16–60 moles of aluminum.

The polyene or other ethylenically unsaturated compound containing a plurality of carbon-to-carbon double bonds may be selected from those disclosed in the prior art, including open chain polyunsaturated hydrocarbons containing 4–20 carbon atoms such as 1,4-hexadiene, monocyclic polyenes, and polycyclic polyenes. The polyunsaturated bridged-ring hydrocarbons or halogenated bridged-ring hydrocarbons are usually preferred. Examples of the bridged-ring hydrocarbons include the polyunsaturated derivatives of bicyclo(2,2,1)heptane wherein at least one double bond is present in one of the bridged rings, such as dicyclopentadiene, bicyclo(2,2,2)hepta-2-5-diene, the alkylidene norbornenes, and especially the 5-alkylidene-2-norbornenes wherein the alkylidene group contains 1–20 carbon atoms and preferably 1–8 carbon atoms, the alkenyl norbornenes, and especially the 5-alkenyl-2-norbornenes wherein the alkenyl group contains about 2–20 carbon atoms and preferably 3–10 carbon atoms. Other bridged-ring hydrocarbons include polyunsaturated derivatives of bicyclo(2,2,2)octane as represented by bicyclo(2,2,2)octa-2,5-diene, polyunsaturated derivatives of bicyclo(3,2,1)octane, polyunsaturated derivatives of bicyclo(3,3,1)nonane, and polyunsaturated derivatives of bicyclo(3,3,2)nonane. At least one double bond is present in a bridged ring of the above compounds, and at least one other double bond is present in a bridged ring or in a side chain. Further examples of polyunsaturated bridged-ring hydrocarbons and their use in the preparation of prior art elastomers are found in U.S. Pat. Nos. 2,933,480, 3,093,620, 3,093,621 and 3,211,709, the disclosures of which are incorporated hereby by reference.

Specific examples of preferred bridged-ring compounds include 5-methylene-2-norbornene, 5-ethylidene-2-norbornene, 5-n-propylidene-2-norbornene, 5-isopropylidene-2-norbornene, 5-n-butylidene-2-norbornene, 5-isobutylidene-2-norbornene, dicyclopentadiene, the methyl butenyl norbornenes such as 5-(2-methyl-2-butenyl)-2-norbornene or 5-(3-methyl-2-butenyl)-2-norbornene, and 5-(3,5-dimethyl-4-hexenyl)-2-norbornene.

The polymerization is preferably carried out on a continuous basis in a dry prior art reaction vessel closed to the outside atmosphere, which is provided with an agitator, reactor cooling means, and conduit means for continuously supplying the ingredients of the reaction mixture including monomers and catalyst, and conduit means for continuously withdrawing the solution of elastomer. The polymerization is carried out in liquid phase in the organic solvent and in the presence of the Ziegler catalyst. The solution of elastomer in the polymerization solvent is withdrawn continuously from the reaction vessel, the catalyst is killed by addition of a catalyst deactivator such as methanol or water, and the organic solvent is removed. The solvent may be removed by injecting the solution below the liquid level of a body of boiling water maintained in a vessel to which steam is supplied. The resulting polymer crumb is removed as a slurry from the vessel, and the polymerization solvent is withdrawn overhead as a vapor. The polymer crumb may be stripped free of traces of solvent and washed free of catalyst residues, followed by separating water from the crumb by means of a shaker screen or other device, and drying of the crumb by means of a prior art extrusion dryer or apron dryer. The dried crumb is then ready for baling in accordance with prior art practice.

The polyunsaturated organo silane, prepared in accordance with the practice of this invention, is employed in the monomer mixture in an amount within the range of 0.05% to 20% by weight of the monomer total and preferably in an amount within the range of 0.1% to 10.0% by weight.

For the interpolymerization reaction of the type described, it is desirable to make use of an adduct of this invention in which the highly hydrolyzable group attached to the silicon atom is other than an alkoxy group or other oxygen containing group, since such oxygen containing groups tend to kill the Ziegler type catalyst and destroys the reactivity required for interpolymerization.

The interpolymers of the invention may be cured following prior art procedures. As a general rule, a curing procedure which is normally followed in curing unsaturated hydrocarbon polymers, such as butyl rubber, styrene-butadiene rubber, natural rubber, polybutadiene rubber, polyisoprene rubbers, etc. is satisfactory.

Various curing procedures, including the materials and the quantities thereof to be employed, are described in a large number of publications which are well known in the art. These publications include "Principals of High Polymer Theory and Practice", Schmidt et al. McGraw-Hill Book Company, New York (1948); "Chemistry and Technology of Rubber", Davis et al., Reinbold Publishing Corporation, New York (1937); "The Applied Science of Rubber", edited by W. J. S. Maunton, published by Edward Arnold, Ltd., London (1961). "The Encyclopedia of Chemical Technology", Kirk and Othmer, published by Innerscience Encyclopedia, Inc., New York (1953), and "Compounding Ingredients for Rubbers", 3rd edition, Cuneo Press of New England, Cambridge, Massachusetts.

As is taught by the above-mentioned texts, rubbery polymers may be vulcanized with vulcanizing agents including, for example, sulfur or sulfur bearing compounds which provide sulfur under the vulcanizing conditions. Sulfur is the preferred vulcanizing agent, and it is usually used in an amount of about 0.5 to 3, and preferably about 1 to 2, parts by weight per hundred parts by weight of rubber in the blend. Zinc oxide and other metal oxides may be used in an amount of, for example, about 2 to 10 parts by weight per 100 parts by weight of rubber (phr). Vulcanization accelerators such as tetramethylthiuram monosulfide, tetramethylthiuram disulfide, the zinc salt of dimethyl dithiocarbamic acid, N,N-diethylthiocarbamyl-2-mercaptobenzothiazole and 2-mercaptozoline may be used.

Conventional fillers and pigments may be incorporated with the polymer, such as about 100–400 phr of carbon black, finely divided silica, esterified silica, titanium dioxide, kaolin and whiting. It is also possible to oil extend the polymers. Naphthenic oils for use in processing or extending rubbery polymers are preferred, and are usually added in an amount of about 10–300 phr and preferably about 20–100 phr. Other types of oil may be used, such as the aromatic, highly aromatic and paraffinic oils.

However, it is a unique facet of this interpolymer that a great improvement over conventional EPDM polymers in physical properties such as tensile, modulus, compression set, tear resistance, and aging takes place when the interpolymer curing formulation contains certain fillers. The preferred fillers are similar to that they contain functional groups which have active hydrogens, such as hydroxyl, carboxyl, primary and secondary amino and sulfhydryl. Typical fillers are hard clay, soft clay, Silene-D, Hi Sil-233, Zeolex-23, Silene EF and the like. These preferred fillers can be used separately or in combination with each other or in combination with other fillers such as carbon black and other non-polar materials. The preferred fillers may also be used in combination with plasticizers and extender oils such as Shellflex 371-N, Cirosol-4240 and the like.

Vulcanization is accomplished by heating the compounded polymers described above at a vulcanizing temperature and for a period of time sufficient for the vulcanization reaction to occur. A temperature of about 130°–180° C for about 10–90 minutes, and preferably about 160° C for about 30 minutes, is often satisfactory. The specific time and temperature that are selected in a given instance will depend upon the nature of the vulcanizing agent, accelerator, and other ingredients which are present.

When carrying out a free radical cure, a heat activated free radical curing agent is admixed with the polymer, and then the mixture is heated to a sufficiently elevated temperature to activate the curing agent and obtain a cure over a practical period of time. Usually, temperatures of about 50°–175° C for a period of 30 minutes to several hours is sufficient. Preferred free radical curing agents are organic peroxides such as dicumyl hydroperoxide, dibenzoyl peroxide, cumene hydroperoxide, ditertiarybutyl peroxide, and bis(alpha, alpha-dimethyl benzyl) peroxide.

The cured polymers of the invention may be used in a wide variety of articles, including tires, belts, hose, tubing, wire coatings, bottles, etc. For some reason that is not fully understood at the present time, the interpolymers of the invention have a much more rapid cure rate when cured with sulfur than would be predicted from the actual or theoretical carbon-to-carbon double bond content.

EXAMPLE 4

A dry flask flushed with nitrogen gas and containing 100 cc of dry hexane was fitted with a self-sealing cap. The hexane was flushed with polymerization grade propylene and then pressured to 15 p.s.i. with propylene. The flask was brought to 35 pounds total monomer pressure by addition from a feed tank containing 65 mole percent ethylene and 35 mole percent propylene. The polymerization was performed in a 35° C water bath shaker.

Additions were made of 0.03 mM of butyl perchlorocrotonate, 0.06 mM of pyridine, 0.6 mM of the adduct of dimethylfulvene and vinyltrichlorosilane from Examples 1 to 4, 9.6 mM of ethylaluminum sesquichloride and 0.0075 mM of vanadium oxytrichloride. As the polymerization proceeded, the monomer composition was maintained constant by continuous addition from the feed tank. At 300 seconds and again at 600 seconds, the above reactants were charged in the following amounts: 0.03 mM butyl perchlorocrotonate, 0.04 mM pyridine, 0.3 mM dimethylfulvene — vinyltrichlorosilane adduct, 0.3 mM ethylaluminum sesquichloride, 0.005 mM vanadium oxytrichloride, At 900 seconds, 0.4 cc of pyridine and 4 cc of methanol were added. After shaking for one hour, 0.05 g of Irganox 1010 was added.

The flask was vented and the contents blended with water. After coagulating the cement with isopropanol, the polymer was redissolved in hexane, recoagulated and dried in a vacuum oven at 80° C. An elastomer yield of 3.4 g was obtained having a spectrum with strong bands at 9.2 and 12.4 microns, indicating a high degree of incorporation of the adduct into the interpolymer.

EXAMPLE 5

This example illustrates the preparation of EPDM interpolymer which includes a polyene as the fourth monomer to impart curability and sulfur vulcanizability to the polymer.

A dry flask was first flushed with nitrogen gas and filled with 100 cc of dry hexane which was flushed with polymerization grade propylene and pressured to 15 p.s.i. with propylene. The flask was brought to 25 p.s.i.g. total pressure by addition from a feed tank containing 65 mole percent ethylene and 35 mole percent propylene. Polymerization was carried out in a water bath maintained at 35° C. Addition was made to the flask of the following reactants: 0.4 mM 5-ethylidene-2-norbornene, 0.3 mM of the adduct of dimethylfulvene and vinyltrichlorosilane, 0.03 mM butyl perchlorocrotonate, 0.04 mM pyridine, 0.3 mM ethylaluminum sesquichloride and 0.0075 mM vanadium oxytrichloride.

As the polymerization proceeded, the monomer composition in ethylene and propylene was maintained constant by continuous additions from the feed tank.

At 350 seconds and again at 600 seconds, the above reactants were again charged to the flask and at 900 seconds, 0.3 cc of pyridine and 4 cc of methanol were added. After shaking for one hour, 0.05 g of Irganox 1010 was added. The flask was vented, the cement was coagulated with isopropanol, the polymer was redissolved in hexane, re-coagulated and dried.

The following are examples of continuous polymerization of procedures for producing interpolymers of this invention:

EXAMPLE 6

The reaction vessel was a one gallon Sutherland reactor equipped with a high speed, heavy-duty, air driven motor; cooling coils; a thermometer; a temperature regulator; a pressure regulator; an injection port; and other openings where monomers, catalyst, and solvent were fed to the reactor. A tube dipping to the bottom of the reactor was present for the removal of the cement produced on a continuous basis. A vapor phase vent was provided to bleed off 10% of the gaseous monomer feed to prevent inert gas buildup.

The clean reactor was assembled, rinsed with dry hexane and purged overnight with dry nitrogen. In the morning the reactor bowl was heated with a flameless blowtorch and hot water was run through the coils until the temperature in the reactor was about 70° C. After this, propylene was flushed through the reactor for about 15 minutes, then the temperature was lowered to ambient and 2 liters of Esso chemical grade hexane, dried over 4A molecular sieves, and silica gel, and stored over sodium, was added to the reactor. As the temperature was brought to 43° C propylene was fed to the reactor through a 4A molecular sieve column until 5.75 feet Hg pressure was reached. The pressure was then brought up to 30 p.s.i.g. with ethylene fed through a 4A molecular sieve column and 0.96 cc of 4.3 mM of isopropylidene-5-trichlorosilyl-2-norbornene and 2.6 cc of 1.5 M ethylaluminum sesquichloride were added.

The monomers were shut off and the catalysts, 0.30 molar ethylaluminum sesquichloride and 0.009 molar vanadium oxytrichloride and 0.63 molar butylperchlorocrotonate at a 40/1/7 aluminum to vanadium to promoter ratio, were fed into the reactor at a constant rate until a drop in pressure in the reactor was noted. At this time the gaseous monomers were fed into the reactor through suitably calibrated rotometers at a rate of 3238 cc/minute, of which 1824 cc were ethylene and 1414 cc were propylene; the 7-isopropylidenyl-5-trichlorosilyl-2-norbornene was added as a 0.476 M solution in hexane at 1.72 cc/minute which provided about 5.7 weight percent to be incorporated into the polymer. The polymerization was controlled by the catalyst pumps which added catalyst on demand as the pressure increased, thus maintaining the 30 pounds pressure throughout the run. When the solution became approximately 8 weight percent polymer, solvent containing 16 cc/cc ethylene was fed at the rate of 55.8 cc per minute into the reactor and the polymer cement taken off which produced about 230 g of polymer per hour.

At this time the ethylene and propylene feeds were adjusted to 987 cc/minute and 2885 cc/minute to compensate for the unreacted monomers removed with the cement.

The solution cement as removed from the reactor was fed to a second stirred vessel which contained anhydrous methanol, than after waiting 30 minutes the cement was washed three times with equal volumes of water in a separatory funnel. The washed and stabilized cement containing 0.1 part Irganox 1010 was fed with nitrogen pressure into a tee joint at the bottom of a 4-liter container full of hot circulating water. The other end of the tee is connected to a steam line and steam was admitted at such a rate as to superheat the rubber cement. The solvent and unreacted monomers were mostly removed by this procedure. The rubber crumb was collected on a screen, washed and chopped up in a Waring Blendor. The rubber crumb was dried in the oven at 90° C to remove any remaining solvent and water giving a rubbery copolymer which contained 63 mole percent ethylene by infrared analysis, using the 720 $cm^{-1}$ absorbance for ethylene and the 968 $cm^{-1}$ absorbance for propylene. The unsaturation expressed in C=C/1000 carbon atoms was about 2.8.

The polymer was analyzed for unsaturation by the consumption of bromine correcting for the substitution reaction by a differential kinetic method based on the spectrophotometric method developed by Siggia et al. *Anal. Chem.* 35, 362 (1963). Curing of the dried rubber was effected by compounding in a Brabender plasticorder (or Banbury size B mixer) based on 100 parts of rubber, 40 parts SRF, 40 parts HAF carbon black, 46 parts of a naphthenic rubber processing oil, 3 parts of zinc oxide, 0.75 parts Captex, 1.5 parts urads and 1.5 parts sulfur. Curing was for 15 minutes at 150° C. The cured properties as determined by standard ASTM methods D412-62T, D927-47, and D395-61-B are reported below.

The hardness was determined on a Shore A durometer. The belt life is the time in hours necessary for a 0.032° cut in a belt to grow to five times its original size when it is run on small pulleys in a chamber at 72° C. Heat rise ($\Delta$ T°F) is by the Goodrich method. The slope of the cure curve was determined on a Monsanto rheometer.

| Formulation | EPsyn 70/40 | Example 63 |
|---|---|---|
| Polymer | 50/50 | 105.5* |
| Crude $ML_{1+8}$ (250° F) | 55 | 48* |
| Compound $ML_{1+4}$ (212° F) | 70 | 100 |
| Tensile, psi | 2075 | 1150 |
| Elongation, % | 500 | 230 |
| 200% Modulus, psi | 675 | 1000 |
| Hardness, Shore A | 66 | 67 |
| Compression Set, % | | |
| 22 Hrs. at 158° F | 26.1 | 20.4 |
| Compound Green Tensile, psi | 63 | 69 |
| Compound Green Elongation, % | 175 | 175 |

*This includes 0.5 parts oil.

EXAMPLE 7

The reaction vessel was a one gallon Sutherland reactor equipped with a high speed, heavy duty, air driven motor; cooling coils; a therometer; a temperature regulator; a pressure regulator; and injection port; and other openings where monomers, catalyst, and solvent were fed to the reactor. A tube diping to the bottom of the reactor was present for the removal of the cement produced on a continuous basis. A vapor phase vent was provided to bleed off 10% of the gaseous monomer feed to prevent inert gas buildup.

The clean reactor was assembled, rinsed with dry hexane and purged overnight with dry nitrogen. In the morning the reactor bowl was heated with a flameless blowtorch and hot water was run through the coils until the temperature in the reactor was about 70° C. After this, propylene was flushed through the reactor for about 15 minutes; then the temperature was lowered to ambient and 2 liters of Esso chemical grade hexane, dried over 4A molecular sieves and stored over sodium, was added to the reactor. As the temperature was brought to 43° C propylene was fed to the reactor through a 4A molecular sieve column until 5.75 feet Hg pressure was reached. The pressure was then brought up to 30 pounds with ethylene fed through a 4A molecular sieve column and 0.62 cc or 2.8 mM 7-isopropylidene-5-trichlorosilyl-2-norbornene and 2.6 cc of 1.5 M ethylaluminum sesquichloride were added.

The monomers were shut off and the catalysts, 0.26 molar ethylaluminum sesquichloride, 0.008 molar vanadium oxytrichloride and 0.55 molar butylperchlorocrotonate at a 40/1/7 aluminum to vanadium to promoter ratio, were fed into the reactor at a constant rate until a drop in pressure in the reactor was noted. At this time the gasous monomers were fed into the reactor through suitably calibrated rotometers at a rate of 3239 cc/minute, of which 1824 cc were ethylene and 1415 cc were propylene; the 7-isopropylidene-5-trichlorosilyl-2-norbornene was added as a 0.31 M solution in hexane at 1.72 cc/minute which provided about 3.8 weight percent to be incorporated into the polymer. The polymerization was controlled by the catalyst pumps which added catalyst on demand as the pressure increased, thus maintaining the 30 pounds HG pressure throughout the run. When the solution became approximately 8 weight percent polymer, solvent containing 16 cc/cc ethylene was fed at the rate of 54.6 cc per minute into the reactor and the polymer cement taken off which produced about 225 g of polymer per hour.

At this time the ethylene and propylene feeds were adjusted to 1015 cc/minute and 2853 cc/minute to compensate for the unreacted monomers removed with the cement.

The solution cement as removed from the reactor was fed to a second stirred vessel which contained anhydrous methanol, then after waiting 30 minutes the cement was washed three times with equal volumes of water in a separatory funnel. The washed and stabilized silane containing cement containing 0.1 part Irganox 1010 was fed with nitrogen pressure into a tee joint at the bottom of a 4-liter container full of hot circulating water. The other end of the tee is connected to a steam line and steam was admitted at such a rate as to superheat the rubber cement. The solvent and unreacted monomers were mostly removed by this procedure. The rubber crumb was collected on a screen, washed and chopped up in a Waring blendor. The rubber crumb was fired in the oven at 90° C to remove any remaining solvent and water giving a rubbery copolymer which contained 63 mol percent ethylene by infrared analysis, using the 720 cm$^{-1}$ absorbance for ethylene and the 968 cm$^{-1}$ absorbance for propylene, and had a reduced specific viscosity in Decalin at 135° C of 2.16. The unsaturation expressed in C=C/1000 carbon atoms was 1.4.

The polymer was analyzed for unsaturation by the consumption of bromine correcting for the substitution reaction by a differential kinetic method based on the spectrophotometric method developed by Siggia et al., *Anal. Chem.* 35, 362 (1963). Curing of the dried rubber was effected by compounding in a Brabender plasticorder (or Banbury size B mixer) based on 100 parts or rubber, 40 parts SRF and 40 parts HAF carbon black, 40 parts of a naphthenic rubber processing oil, 3 parts of zinc oxide, 1 part of stearic acid, 0.75 parts of mercaptobenzothiazole, 1.5 parts of tetramethylthiuram sulfide urads and 1.5 parts sulfur. Curing was for 15 minutes at 150° C. The cured properties as determined by standard ASTM methods D412-62T, D927-47, and D395-61-B are reported below.

The hardness was determined on a Shore A durometer. Heat rise (Δ T°F) is by the Goodrich method. The slope of the cure curve was determined on a Monsanto rheometer.

| Formulation | EPsyn 70 | Example 17 |
|---|---|---|
| Polymer | 100 | |
| Compound ML$_{1\pm4}$ (212° F) | 78 | 90 |
| Tensile, psi | 1925 | 1500 |
| Elongation, % | 430 | 340 |
| 300% Modulus, psi | 1350 | 1325 |
| Goodrich T | 47 | 49 |
| Compression Set, % | | |
| 22 Hrs. at 158° F | 23.7 | 15.6 |
| Compound Green Tensile, psi | 31 | 36 |
| Compound Green Elongation, % | 170 | 110 |
| Rheometer Cure rate | | |
| Units/min | 17.0 | 6.0 |
| T-90, min | 15.0 | 22.25 |
| Min. Torque, In/Lbs | 35 | 36 |
| Max. Torque, In/Lbs | 93 | 113 |
| T-S2, min.* | 2.5 | 1.5 |

*Scorch, Minutes to 2 inch lb. above minimum torque.

The concept of this invention can be adapted for the manufacture of interpolymers which are liquid or viscous in character. Such liquid or viscous interpolymers have found use as a binder component in caulking compounds when compounded with suitable fillers with or without curing agents, and many other beneficial uses are clearly indicated.

Such interpolymers follow the concepts previously described but are interpolymerized to a lower molecular weight, as illustrated by the following examples.

EXAMPLE 8

The following example describes the preparation of a liquid polymer containing ethylene, propylene, and 7-isopropylidenyl-5-trichlorosilyl-2-norbornene.

A one-gallon Sutherland reactor was equipped with a high speed, heavy duty, air driven motor; cooling coils, a thermometer; a temperature regulator, a pressure regulator, an injection port; and other openings where monomers, catalyst, and solvent could be fed to the reactor. A tube dipping to the bottom of the reactor was present for the removal of the cement produced on the continuous basis. A vapor phase vent was provided to bleed off 15% of the gaseous monomer feed to prevent inert gas buildup.

The clean reactor was assembled, rinsed with dry hexane, and purged overnight with dry nitrogen. In the morning, the reactor bowl was heated with a flameless blowtorch, and hot water was run through the coils until the temperature in the reactor was about 70° C. After this, propylene was flushed through the reactor for about 15 minutes; then the temperature was lowered to ambient and one liter of Esso chemical grade hexane, dried over 4A molecular sieves and stored over sodium, was added to the reactor. As the temperature was brought to 45° C, propylene was fed to the reactor through a 4A molecular sieve column until 16 psi was reached. The pressure was then brought up to 20 psi with ethylene fed through a 4A molecular sieve column and brought up to 35 psi with dry hydrogen; 2.6 cc of 1.5M diethylaluminum chloride and 0.56 cc of 7-isopropylidenyl-5-trichlorosilyl-2-norbornene were added.

The monomers were shut off and the catalysts (1.2 molar diethylaluminum chloride, 0.03 molar vanadium oxytrichloride at a 40 to 1 aluminum to vanadium ratio, and 0.21 molar butyl perchlorocrotonate at a ratio of 7 to 1 perchlorocrotonate vanadium ratio) were fed into the reactor at a constant rate until a drop in pressure in the reactor was noted. At this time, the gaseous monomers were fed into the reactor through suitably calibrated rotometers at a rate or 3605 cc/minute, of which 225 cc was hydrogen, 1700 cc was ethylene, and 1680 cc was propylene; the 7-isopropylidenyl-5-trichlorosilyl-2-norbornene was added as a 0.55 M solution in hexane at 1.8 cc/minute which provided about 6.5 weight percent to be incorporated into the polymer. The polymerization was controlled by the catalyst pumps which added catalyst on demand as the pressure increased, thus maintaining the 35 psi pressure throughout the run. When the solution became approximately 8% polymer, solvent containing 16 cc/cc ethylene was fed at the rate of 60 cc per minute into the reactor and the polymer cement taken off, which produced about 241g of polymer per hour.

At this time, the ethylene and propylene feeds were adjusted to 256 cc/minute and 3225 cc/minute to compensate for the unreacted monomers removed with the cement; the hydrogen feed remained unchanged.

The polymer cement, as removed from the reactor, was passed into a second stirred gallon Sutherland reactor so that for each liter of cement, 200 ml of methanol was present. After a residence period of 20 minutes, the cement was twice washed with methanol and the excess methanol decanted. The cement was placed in a rotary evaporator and Irganox 1010 antioxidant added as a solution in toluene so that 0.1 weight % antioxidant would remain in the polymer after solvent removal. The flask was heated to 100° C and rotated while a vacuum was applied; the vacuum removed the hexane from the cement. The evaporation was continued for an additional 30 minutes after all bubble formation had ceased. The polymer was recovered as a honey colored liquid which was quite fluid at elevated temperatures. Analysis of it showed that it contained 54.4% ethylene and 5 weight % silane monomer incorporation which had been converted to methoxy derivative. The bulk viscosity of the product measured by a Brookfield viscometer was 1400 poise at 23.5° C.

Curing the liquid polymer was effected by compounding in a Brabender Plasti-Corder. The recipe is based on 100 parts of polymer, 20 parts of fumed silica (Cab-O-Sil MS-5), 10 parts zinc oxide, 2.5 parts titanium dioxide, and 4 parts dibutyltin diacetate. The polymer was placed on a waxed cardboard and allowed to cure at ambient temperature and 45–50% humidity for 7 days. The cured properties were determined by standard ASTM methods and are as follows:

| Tensile strength, psi | 200 |
| Elongation, % | 135 |
| Tear (Die C), ppi | 25 |
| Hardness (Shore A) | 32 |

EXAMPLE 9

This example describes the preparation of a liquid polymer containing ethylene, propylene, and the silane containing monomer. The reaction was carried out in a 10-gallon continuous flow, stirred tank reactor which is normally used for solution polymerization of EPDM and is of a type familiar to those skilled in the art.

In a typical preparation of a liquid interpolymer of this invention, a commercial grade hexane was used as the solvent. Solvent feed rate was 76 lbs./hr. and the level in the reactor was controlled to give a residence time of about 35 minutes. Polymerization grade ethylene was added at 4.5 Lbs/hr and polymerization grade propylene was added at 11.2 lbs./hr. Third monomer 7-isopropylidenyl-5-trichlorosilyl-2-norbornene was added as a 0.54 M solution in hexane at a rate of 2100 ml/hr. which provided about 7.8 weight percent to be incorporated into the polymer. Catalyst, vanadium oxytrichloride ($VOCl_3$) was fed as a 0.023 M solution in hexane at a rate of 388 ml/hr. Co-catalyst, diethylaluminum chloride (DEAC), was fed as a 1.2 M solution in hexane at a rate of 321 ml/hr. The molar ratio of aluminum to vanadium was 41 to 1. Activator, n-butyl perchlorocrotonate (BPCC), was fed as a 0.21 M solution in hexane at a rate of 312 ml/hr. The molar ratio of BPCC to vanadium was 7.6 to 1. Inhibitor, pyridine, was added as a 0.78 M solution in hexane at a rate of 225 ml/hr. Sufficient hydrogen was added to maintain 42 mole percent hydrogen in the reactor vapor space. At a reactor temperature of 113° F and reactor pressure of 54.7 psia, 8.6 lbs. per hour of polymer were produced which had an ethylene to propylene molar ratio of 48 to 52.

Following the reactor, the polymer cement was shortstopped with technical grade methanol which was added at three gallons per hour to the cement stream. Methanol serves to remove catalyst residue and to methoxylate the trichloro group of the 7-isopropylidenyl- 5-trichlorosilyl-2-norbornene. Additionally, 135 ml per hour of a 5.5 weight % solution of antioxidant (Irganox 1010) in toluene was added to the cement stream at this point so that the neat polymer would contain 0.18 weight % antioxidant. The mixture of polymer cement and methanol was contacted in an agitated vessel with a 15 minute residence time operating at about 100° F and 65 psia. The mixture was then decanted into a vessel with a 60 minute residence time operating at 100° F and 63 psia to separate a methanol-rich phase and a polymer cement phase. The polymer cement exiting the decantation vessel was again contacted with three gallons per hour of technical grade methanol and the mixture was introduced into a second agitated vessel which was identical to the first in mechanical design and operating conditions. The mixture was then decanted into a vessel having a resistance time of 40 minutes and operating at 100° F and 63 psia.

The decanted polymer cement was stripped of unreacted monomers, solvent, and residual methanol in a wiped film evaporator. Recovery temperature ranged from 210° F to 225° F at an absolute pressure of 23 mm Hg. Residual hexane in the product, which was a honey colored liquid at room temperature, was less than 1.0%. Bulk viscosity of the product was 563,000 centipoise at 77° F as measured with a Brookfield viscometer.

When cured according to the recipe found in Example 8, the following physical properties were obtained:

| Tensile strength, psi | 216 |
| Elongation, % | 260 |

-continued

| Tear (Die C), ppi | 20 |
| Hardness (Shore A) | 15 |

EXAMPLE 10

This example describes the preparation of a lower molecular weight polymer which was subsequently thoroughly evaluated as a sealant.

The polymerization was carried out as in Example 9, except that the ethylene to propylene ratio was adjusted so that the molar ratio was 52% ethylene and 48% propylene by raising the ethylene flow to 4.6 pounds per hour. The third monomer concentration was lowered so that 1600 ml/hr. was added which provided 6.0 weight % to be incorporated into the polymer. In order to maintain the polymerization rate, the solution of vanadium oxytrichloride was fed at 412 ml per hour, DEAC solution at 398 ml/hr., and BPPC at 386 ml./hr. This resulted in a ratio of 42 DEAC to 7.8 BPCC to 1 vanadium. The inhibitor addition was lowered slightly to 202 ml/hr., and sufficient hydrogen was added to maintain 47 mole % hydrogen in the vapor space.

Following the reactor, the cement was treated the same as that in Example 9. The bulk properties of this polymer are reported in Table I.

Table I

| Vicsocity at 75° F | 4,000 poise |
| Average Molecular Weight | ~4,000 |
| Pour Point | 70° F |
| Weight % Crosslinking Agent | 2.7 |
| Low Temp. Flexibility, ° F | −65 |
| Specific Gravity at 25° C | |

The polymer prepared in this example was compounded in both a one-part and a two-part system.

ONE PART SYSTEM

The fillers were thoroughly dried and all additives purified. Two recipes are described in Table II. In the one-part system, it has been found that any acidic or basic material, such as morpholine, acetic anhydride, and acetic acid, tends to accelerate the cure rate of the compound. On the other hand, the use of traces of alcohols, ketones, or ether tends to stabilize the polymer and retards the cure rate.

Table II

| Formulation Parts | One-Part Systems | |
| --- | --- | --- |
| | 1 | 2 |
| Polymer from Example 10 | 100 | 100 |
| Cab-O-Sil | 10 | — |
| Translink | 30 | 40 |
| Zinc Oxide | 5 | 5 |
| Titanium Dioxide | 5 | 5 |
| Toluene | 10 | 10 |
| Morpholine | 3 | 1 |
| 2-Methoxyethanol | 2 | — |
| Hexyl Alcohol | — | 3 |
| DBTDA | 5 | 3 |
| Tack Free Time (hours) | 2.5 | 2.3 |
| Cure through ¼" (days) | 3 | 6.4 |
| Shelf Life in Tube (days) | 40+ | 41+ |
| Cured Rubber | Soft and good elongation | Soft and good elongation glossy surface |

TWO-PART SYSTEM

The polymer, fillers, pigments, etc., were thoroughly mixed as one part and then the catalyst was added as a second part, either neat or in a diluent.

Compounding of the base product described above was carried out in a Brabender Plasti-Corder. Typical ingredients were used which have found utility in caulk and sealant formulations. Physical properties obtained when the polymer prepared in Example 10 was compounded are shown in Table III.

Table III

| Typical Rubbers | A | B | C |
| --- | --- | --- | --- |
| Polymer of examples 8,9,10 | 100 | 100 | 100 |
| Fumed Silica (Cab-O-Sil MS) | 20 | — | — |
| Silane Treated Clay (Translink 37) | — | 100 | 150 |
| TiO$_2$ | 5 | 5 | 5 |
| ZnO | 10 | 10 | 10 |
| Dibutyltin Diacetate (DBTDA) | 5 | 5 | 5 |
| Physical Properties | | | |
| Tensile, psi | 287 | 232 | 338 |
| Elongation, % | 280 | 150 | 120 |
| Hardness (Shore A) | 25 | 29 | 34 |
| Tack Free Time (hours) | 3 | 2 | 2 |
| Working Time (hours) | 1 | 1.5 | 1.5 |
| Complete Cure Time (Days) | 7 | 7 | 7 |
| Extrusion Rate (⅛", 90 psi) (g/min.) | 50 | ~50 | ~40 |
| Polymer Viscosity (cps × 10$^{-3}$) | 250 | 250 | 250 |

EXAMPLE 11

The reaction was carried out in a 20 gallon continuous flow stirred tank reactor which is normally used for the solution polymerization of EPDM and is of a type familiar to those skilled in the art. In a typical preparation of a liquid interpolymer representative of the practice of this invention, commercial grade hexane was used as the solvent. Solvent feed rate was 76 lbs./hr. and the level in the reactor was controlled to give a residence time of about 35 minutes. Polymerization grade ethylene was added at 4.5 lb./hr. and polymerization grade propylene was added at 11.2 lb./hr. Third monomer, 7-isopropylidenyl-5-trichlorosilyl-2-norbornene, was added as a 0.54 M solution in hexane at a rate of 2100 ml/hr which provided about 7.8 weight percent to be incorporated into the polymer. Catalyst, vanadium oxytrichloride (VOCl$_3$) was fed as a 0.023 M solution in hexane at a rate of 388 ml/hr. Co-catalyst, diethylaluminum chloride (DEAC), was fed as a 1.2 M solution in hexane at a rate of 321 ml/hr. The molar ratio of aluminum to vanadium was 41 to 1. Activator, n-butyl perchlorocrotonate (BPCC), was fed as a 0.21 M solution in hexane at a rate of 312 ml/hr. The molar ratio of BPCC to vanadium was 7.6 to 1. Inhibitor, pyridine, was added as a 0.78 M solution in hexane at a rate of 225 ml/hr. Sufficient hydrogen was added to maintain 42 mole percent hydrogen in the reactor vapor space. At a reactor temperature of 113° F and reactor pressure of 54.7 psia, 8.6 lb./hr. of polymer were produced which had an ethylene to propylene molar ratio of 48 to 52.

Following the reactor, the polymer cement was shortstopped with technical grade methanol which was added at three gallons per hour to the cement stream. Methanol serves to remove catalyst residue and to methoxylate the tri-chloro group of the 7-isopropylidenyl-5-trichlorosilyl-2-norbornene. Additionally 138 ml/hr of a 5.5 weight % solution of anti-oxidant (Irganox 1010) in toluene were added to the cement stream at this point so that the neat polymer would contain 0.18 weight % anti-oxidant. The mixture of polymer cement and methanol were contacted in an agitated vessel with a 15 minute residence time, operating at about 100° F and 65 psia. The mixture was then decanted in a vessel with a 60 minute residence time operating at 100° F and 63 psia to separate a methanol-rich phase and a polymer cement phase. The polymer cement exiting the decantation vessel was again contacted with three gallons per hour of technical grade methanol and the mixture was introduced into a second agitated vessel whih was identical to the first in mechanical design and operating conditions. The mixture was then decanted in a vessel having a residence time of 40 minutes and operating at 100° F and 63 psia.

The decanted polymer cement was stripped of unreacted monomers, solvent, and residual methanol in a wiped film evaporator. Recovery temperature ranged from 210° F to 225° F at an absolute pressure of 23 mm Hg. Residual hexane in the product, which was a honey colored liquid at room temperature, was less than 1.0%. Bulk viscosity of the product was 563,000 centipoise at 77° F, as measured with a Brookfield viscometer.

As described in our copending application entitled "EDPM Interpolymers formed with unsaturated organo silanes", filed on or about Dec. 31, 1970, the organo silicon, now present as a component of the formed interpolymer, provides an interpolymer which has a number of unique and interesting features.

By reason of the presence of the highly hydrolyzable groups attached to the silicon atom in the interpolymer, the formed interpolymer can be made to jump in molecular weight by crosslinking in response to the addition of water. Such water may be added to kill the catalyst with the removal of hydrolyzable groups to form the corresponding polymeric silanols which immediately react by condensation for crosslinking to increase the molecular weight, as described in Example 4. When water is added after the catalyst has been killed to stop the polymerization reaction but before the hydrolyzable groups have been removed, the described crosslinking with increase in molecular weight can still occur.

As further described in the aforementioned copending application, the interpolymer can be modified in various ways by reaction to replace hydrolyzable groups attached to the silicon atom, with alcohols, carboxylic acids, organic anhydrides, amines, phenols and the like to substitute such groupings for the halogen or other hydrolyzable group on the silicon atom. When the alcohol is a primary alcohol, such as a methanol, ethanol, propanol, the OR group of the alcohol will substitute for the hydrolyzable group attached to the silicon atom to become a part of the interpolymer. By proper selection of the organic group of the alcohol, various modifications can be achieved. For example, when the organic group is an unsaturated group, such as an aliyl alcohol, crotyl alcohol and the like, or when such group is an unsaturated group as a norbornenyl group, additional unsaturation can be incorporated into the interpolymer to enhance cure, crosslinking or the like.

When the alcohol is a secondary or tertiary alcohol such as isopropanol, sec-butanol, t-butanol and the like, the alcohol serves to kill the catalyst, as in Example 5, but without complete replacement of hydrolyzable groups attached to the silicon atom so that they will remain in the interpolymer for subsequent reaction, or for replacement with a primary alcohol, primary amine, carboxylic acid or anhydride and the like.

The groups which are substituted for the hydrolyzable group can take many forms. If the group is an anti-oxidant, as in an alcoholic or phenolic substitute anti-oxidant, the anti-oxidant will become part of the interpolymer to improve its oxidation resistance. If the group contains halogen, such as chlorine or bromine, such as 1,2,3,4,7,7-hexachloronorbornene-2-methanol, the interpolymer will be enhanced in its flame resistance and the like. If the group contains additional hydroxyl, amino or corboxyl groups, the interpolymer can be inter-reacted with such resinous materials as phenol or urea formaldehyde resins, polyester resins, polyether resins, polyamide resins, polyurethanes and the like in the form of resinous bodies, fibers or films, to provide a strong integrated relationship therewith or to produce a system which can function as an adhesive, binder or coating capable of forming a strong bonding relationship with fibers, films and products formed of such resinous materials.

It will be apparent from the foregoing that we have provided a new and improved compound which finds utility in the manufacture of polymeric materials having novel characteristics.

It will be understood that changes may be made in the details of formulation and operation, without departing from the spirit fo the invention, especially as defined in the following claims.

We claim:

1. An interpolymer comprising the reaction product by addition polymerization with a Ziegler catalyst through unsaturated groups of (1) an adduct of the formula

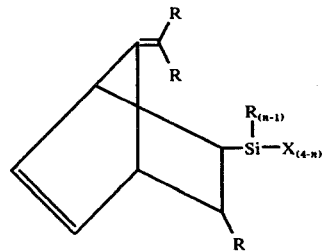

where R is selected from the group consisting of hydrogen, $C_1$ to $C_5$ alkyl, halogen-substituted $C_1$ to $C_5$ alkyl, an unsaturated organic group having 1 to 8 carbon atoms and a norbornenyl group, X is a hydrolyzable group selected from the group consisting of a tertiary amino group and halogen, and $n$ is a number from 1 to 3, (2) ethylene and (3) an unsaturated monomer selected from the group consisting of a monoolefin containing 3 to 20 carbon atoms, or a non-conjugated polyene in which the ethylene and monoolefin, when present, are present in the interpolymer in the weight ratio of 90–5 ethylene to 10–95 monoolefin, in which, when a polyene is present in the polymer, the polymer is chemically bound in the interpolymer in an amount to provide an interpolymer having an unsaturated level of at least 1.5 carbon to carbon double bonds per 1000 carbon atoms and the adduct is present in the interpolymer in an amount within the range of 1.0 to 20 percent by weight.

2. An interpolymer as claimed in claim 1 in which the unsaturated monomer is non-conjugated polyene.

3. An interpolymer as claimed in claim 1 in which the unsaturated monomer is propylene and the propylene is present in an amount sufficient to provide a mole ratio of ethylene to propylene within the range between 90:5 and 10:95.

4. An interpolymer as claimed in claim 3 wherein the weight ratio of ethylene to propylene is between 70:30 and 55:45.

5. An interpolymer comprising the reaction product by addition polymerization with a Ziegler catalyst through unsaturated groups of (1) an adduct 7-isopropylidenyl-5-trichlorosilyl-2-norbornene, (2) ethylene and (3) propylene, in which the weight ratio of ethylene to adduct in the interpolymer is within the range of 99.95:0.05 to 80.0:20.0, the weight ratio fo ethylene to propylene in the interpolymer is within the range of 10:5 to 10:90, and the adduct bound in the interpolymer constitutes 0.05 to 20% by weight of the total of the ethylene and propylene in the interpolymer, and the mole ratio of ethylene to propylene in the interpolymer is between 90:5 and 10:95.

6. An interpolymer comprising the reaction product by addition polymerization with a Ziegler catalyst through unsaturated groups of (1) an adduct 7-isopropylidenyl-5-trichlorosilyl-2-norbornene, (2) ethylene, and (3) either a monoolefin containing 3-23 carbon atoms or a non-conjugated polyene, in which the adduct is present in the interpolymer in an amount within the range of 1.0 to 20% by weight, the weight ratio of ethylene to monoolefin in the interpolymer is within the range of 90:5 to 10:95, the adduct constitutes 0.5 to 20% by weight of the total of the ethylene, monoolefin and polyene, and the polyene is chemically bound in the interpolymer in an amount to provide an unsaturation level of at least 1.5 carbon to carbon double bonds per 1000 carbon atoms.

7. An interpolymer as claimed in claim 6 wherein the monoolefin is propylene.

8. An interpolymer as claimed in claim 6 wherein the polyene is a 5-alkylidenyl-2-norbornene wherein the alkylidenyl group contains 1-21 carbon atoms.

9. An interpolymer comprising the reaction product by addition polymerization with a Ziegler catalyst through unsaturated groups of (1) an adduct of the formula

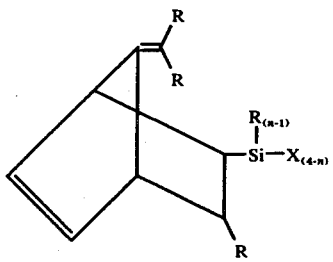

wherein R is selected from the group consisting of hydrogen, $C_1$ to $C_5$ alkyl, halogen-substituted $C_1$ to $C_5$ alkyl, an unsaturated organic group having 1 to 8 carbon atoms and a norbornenyl group, X is a hydrolyzable group selected from the group consisting of a tertiary amino group and halogen, and n is a number from 1 to 3, (2) ethylene and (3) a non-cojugated polyene in which the weight ratio of ethylene to adduct in the interpolymer is within the range of 99.95:0.05 to 80.0:20.0, the adduct constitutes between 0.05 to 20% by weight of the total of the ethylene and the polyene chemically bound in the interpolymer, and the polymer is chemically bound in the interpolymer in an amount to provide an unsaturation level of at least 1.5 carbon to carbon double bonds per 1000 carbon atoms of polymer.

10. an interpolymer as claimed in claim 9 wherein the polyene is an alkylidene-2-norbornene.

11. An interpolymer comprising the reaction product by addition polymerization with a Ziegler catalyst through unsaturated groups of (1) an adduct of the formula

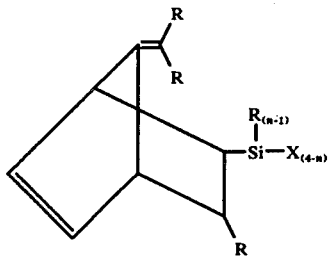

wherein R is selected from the group consisting of hydrogen, $C_1$ to $C_5$ alkyl, halogen-substituted $C_1$ to $C_5$ alkyl, an unsaturated organic group having 1 to 8 carbon atoms and a norbornenyl group, X is a hydrolyzable group selected from the group consisting of a tertiary amino group and halogen, and n is a number from 1 to 3, (2) ethylene and (3) a monoolefin containing 3 to 20 carbon atoms in which the weight ratio of ethylene to the adduct in the interpolymer is within the range of 99.95:0.05 to 80.0:20.0, the weight ratio of the ethylene to monoolefin in the interpolymer is within the range of 90:5 to 10:95 and the adduct constitutes 0.05 to 20% by weight of the total of the ethylene and the monoolefin in the interpolymer.

12. An interpolymer as claimed in claim 11 wherein the monoolefin is propylene.

13. An interpolymer as claimed in claim 11 wherein the adduct is 7-isopropylidenyl-5-trichlorosilyl-2-norbornene.

14. An interpolymer comprising the reaction product by addition polymerization with a Ziegler catalyst through unsaturated groups of (1) an adduct of the formula

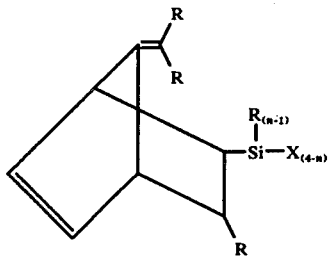

wherein R is selected from the group consisting of hydrogen, $C_1$ to $C_5$ alkyl, halogen-substituted $C_1$ to $C_5$ to alkyl, an unsaturated organic group having 1 to 8 carbon atoms and a norbornenyl group, X is a hydrolyzable group selected from the group consisting of a tertiary amino group and halogen, and $n$ is a number from 1 to 3, and (2) ethylene in which the weight ratio of ethylene to the adduct in the interpolymer is within the range of 99.95:0.05 to 80.0:20.0.

15. An interpolymer as claimed in claim 14 wherein the adduct is 7-isopropylidenyl-5-trichlorosilyl-2-norbornene.

16. An interpolymer as claimed in claim 1 in which the adduct is 7-isopropylidenyl-5-trichlorosilyl-2-norbornene.

* * * * *

UNITED STATES PATENT OFFICE
CERTIFICATE OF CORRECTION

Patent No. 4,022,961        Dated May 10, 1977

Inventor(s) William C. Bond, Jr., and Harold J. Wahlborg

It is certified that error appears in the above-identified patent and that said Letters Patent are hereby corrected as shown below:

column 2, line 41, change by to of;

column 3, line 16, after recycle add "thereby";

column 9, line 1, change 350 to 300;

column 14, line 1, change 10 to 20.

Signed and Sealed this

*second* Day of *August 1977*

[SEAL]

*Attest:*

RUTH C. MASON
*Attesting Officer*

C. MARSHALL DANN
*Commissioner of Patents and Trademarks*